(12) United States Patent
Corella et al.

(10) Patent No.: US 8,149,392 B1
(45) Date of Patent: Apr. 3, 2012

(54) METHOD AND APPARATUS FOR REDUCING HANDOFF INACCURACIES IN A COUNTERMEASURES SYSTEM

(75) Inventors: Armando Corella, Azusa, CA (US); John A. Carattini, Chino Hills, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 954 days.

(21) Appl. No.: 12/080,158

(22) Filed: Mar. 31, 2008

Related U.S. Application Data

(60) Provisional application No. 60/920,712, filed on Mar. 29, 2007.

(51) Int. Cl.
*G01N 3/36* (2006.01)

(52) U.S. Cl. .............................. 356/28; 356/29; 348/164

(58) Field of Classification Search .................... 356/28, 356/29, 139.02–139.08; 348/164; 382/103, 382/294, 153
See application file for complete search history.

(56) References Cited

U.S. PATENT DOCUMENTS

| | | | |
|---|---|---|---|
| 5,005,083 A | 4/1991 | Grage et al. | |
| 5,418,364 A | 5/1995 | Hale et al. | |
| 6,903,343 B2 | 6/2005 | Amon et al. | |
| 7,193,691 B2 | 3/2007 | Weber | |
| 7,292,319 B1 * | 11/2007 | Carter et al. | 356/29 |
| 7,636,452 B2 * | 12/2009 | Kamon | 382/103 |
| 7,679,733 B2 * | 3/2010 | Carter et al. | 356/139.03 |
| 7,733,465 B2 * | 6/2010 | Gidseg et al. | 356/29 |
| 2006/0000987 A1 | 1/2006 | Weber | |
| 2006/0175549 A1 | 8/2006 | Miller et al. | |

* cited by examiner

*Primary Examiner* — Layla Lauchman
(74) *Attorney, Agent, or Firm* — Daniel J. Long; Robert K. Tendler

(57) ABSTRACT

A method for reducing handoff inaccuracies in a DIRCM countermeasures system comprising the step of adding a second on-axis camera to the DIRCM countermeasures system.

15 Claims, 5 Drawing Sheets

METHOD AND APPARATUS FOR REDUCING HANDOFF INACCURACIES IN A COUNTERMEASURES SYSTEM

CROSS REFERENCE TO RELATED APPLICATION

This application claims rights under 35 USC§119(e) from U.S. patent application Ser. No. 60/920,712 filed Mar. 29, 2007, the contents of which are incorporated herein by reference.

BACKGROUND OF THE INVENTION

1. Field of the Invention

The present invention relates to countermeasures systems and particularly to Directed Infra Red Countermeasures (DIRCM) systems.

2. Brief Description of Prior Developments

Handoff inaccuracies have been a challenge in some DIRCM systems since directed/focused energy became a requirement to deter Infra Red (IR) detecting-guided missiles.

Handoff inaccuracies are driven by platform specifics and environmental issues (variables). Such platform specifics and environmental issues include aircraft flexure; missile warner, specifics such as inherent tolerances, mounting inaccuracies, resolution, and processing latencies; and system processing latencies such as update rate, environmental changes, and DIRCM pointing errors.

The foregoing is further illustrated in FIG. 1. From FIG. 1, it will be understood that 1) sensor location and installation have mounting tolerances contributing to handoff inaccuracies as well as aircraft flexures 2) the missile acquisition warner electronics determines (processes) validity of threat this causes positional data to be late (latency) 3) once a declaration has been handed over (handoff) to the DIRCM controller it must then process the data and command the gimbal to slew to the latency riddled position before track and energy-on-target can occur.

SUMMARY OF INVENTION

According to the present invention, hand off inaccuracies may be reduced by adding a second on-axis camera to the DIRCM countermeasures system.

BRIEF DESCRIPTION OF THE DRAWINGS

The present invention is further described with reference to the accompanying drawings wherein.

DETAILED DESCRIPTION OF THE PREFERRED EMBODIMENT

Figure 1:
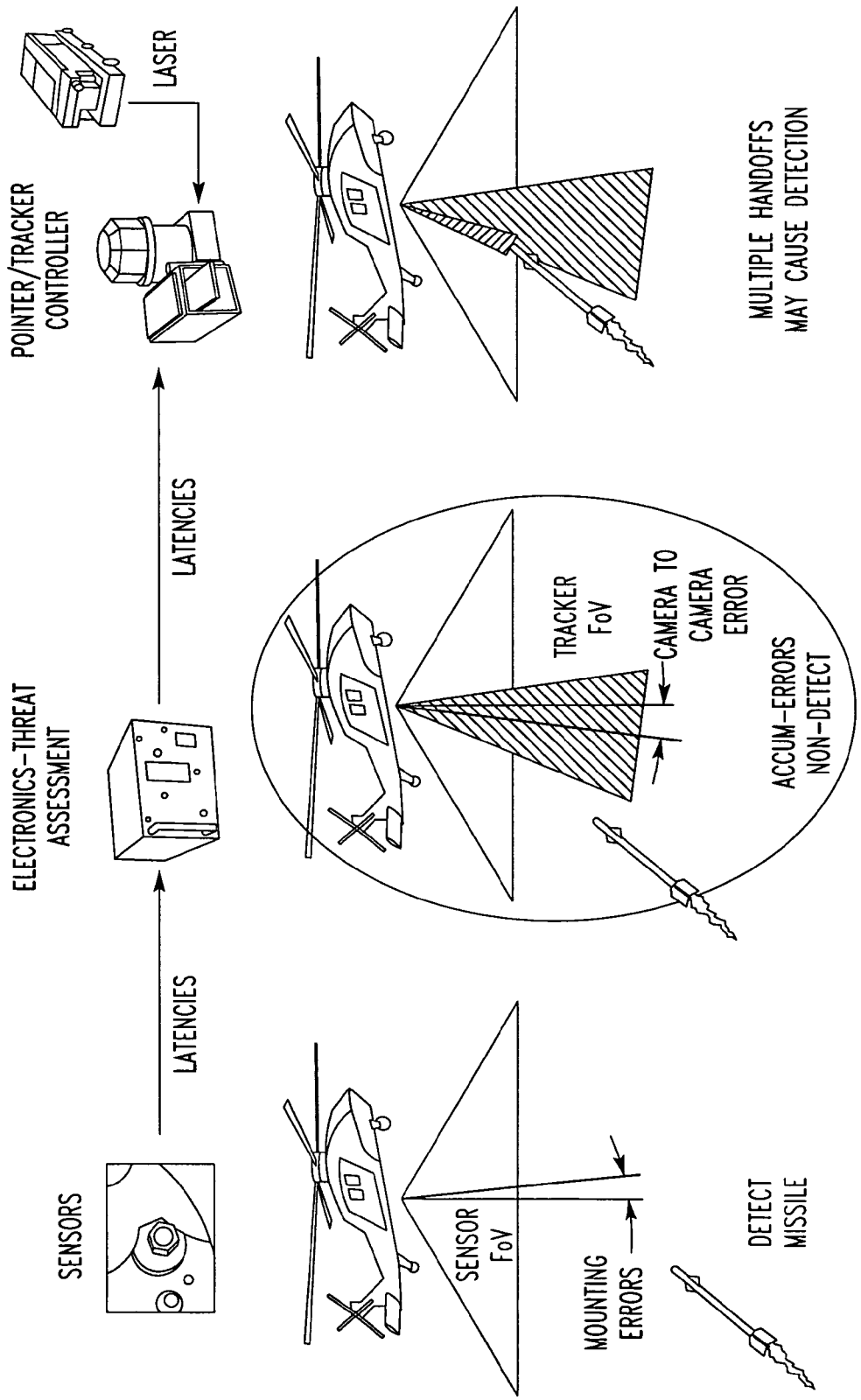
FIG. 1 is a schematic drawing illustrating handoff inaccuracies.
Figure 2:
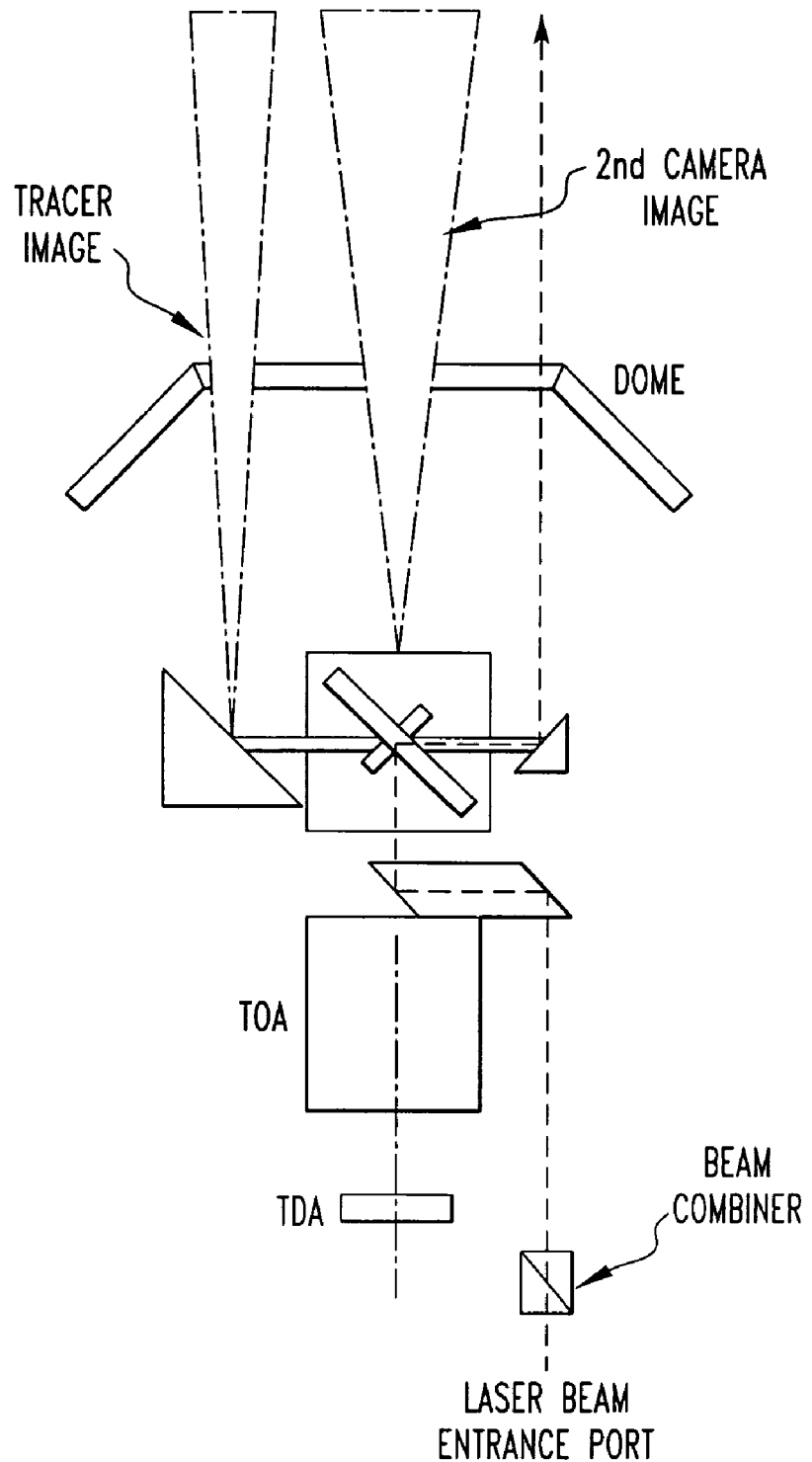
FIG. 2 is an illustration of how a second wide field of view camera can improve the accumulative affects of hand-off inaccuracies

In the present invention a camera should be selected with a wide field-of-view (i.e. 10° FoV, with zoom) which allows acquisition of threat if not seen by fine-track-sensor (FTS). Such a camera does not impact existing optical prescription since the focal plane array does not need to increase in size to compensate for lower resolution; and mirror sizes do not require changes. FoV is selected to absorb hand-off errors. An IR imaging camera (long-wavelength) is selected to provide a two-color fine-track-sensor (FTS). A long-wavelength camera allows multi-role use for forward-looking IR (FUR) applications. In FIG. 2 TOA refers to a Tracker Optics Assembly and TDA refers to a Tracker Detector Assembly.

Figure 3:
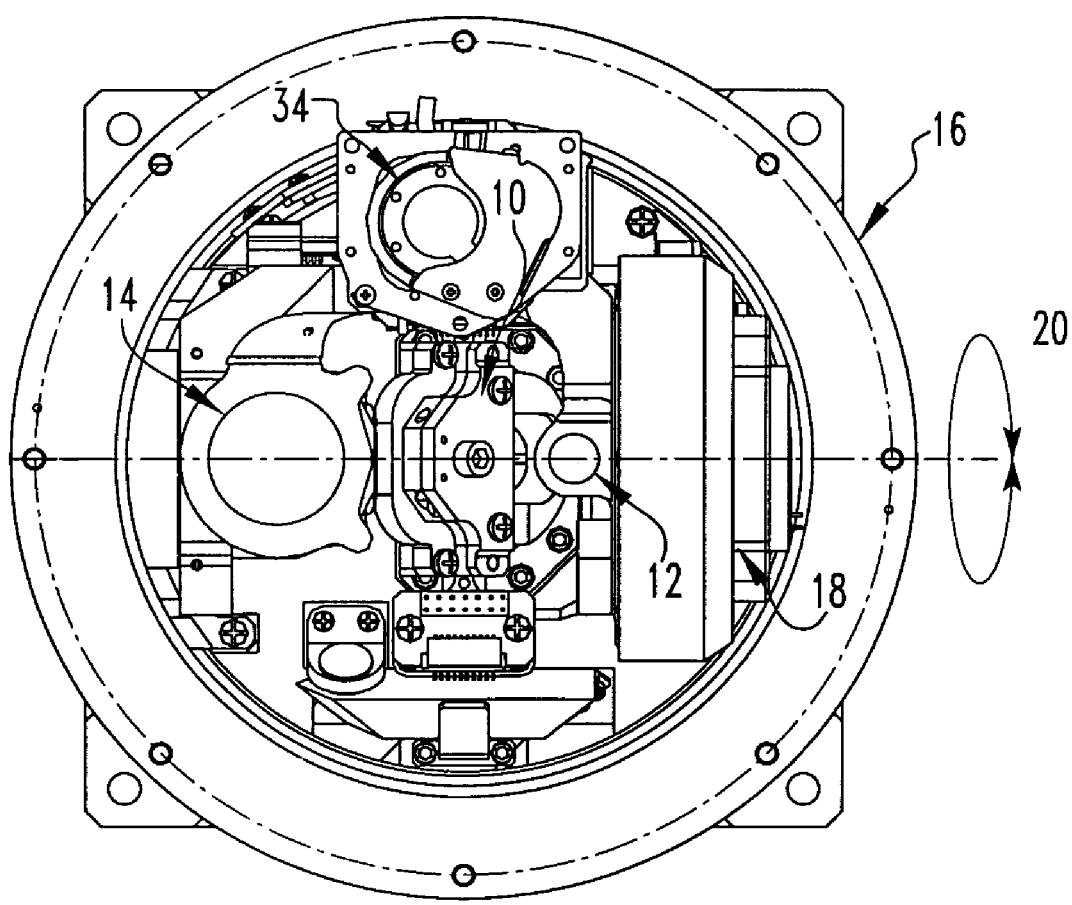
FIGS. 3, 4 and 5 are respectively top, side, and end views of cameras mounted on gimbals in a preferred embodiment of the present invention.
Figure 4:
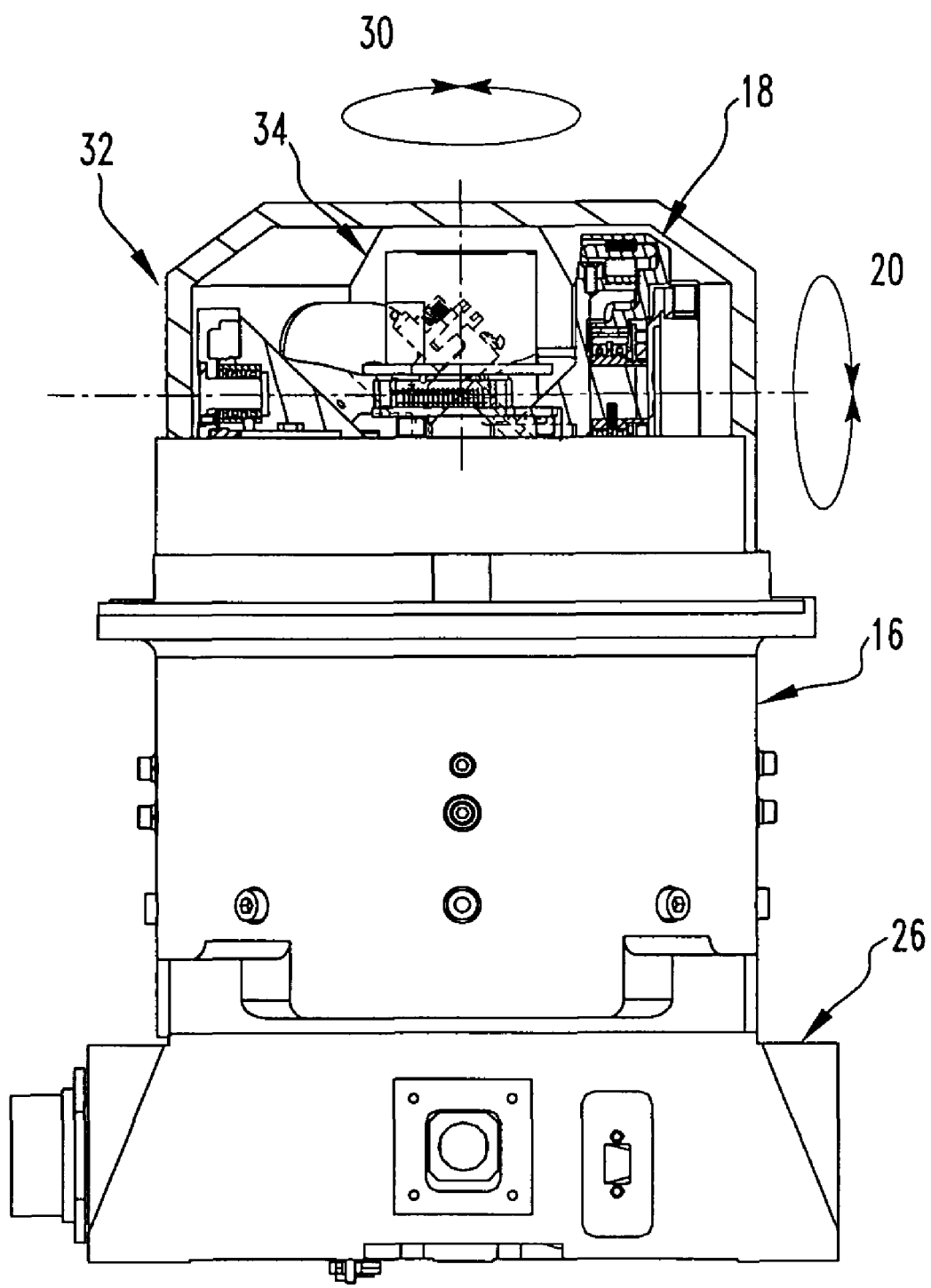
Figure 5:
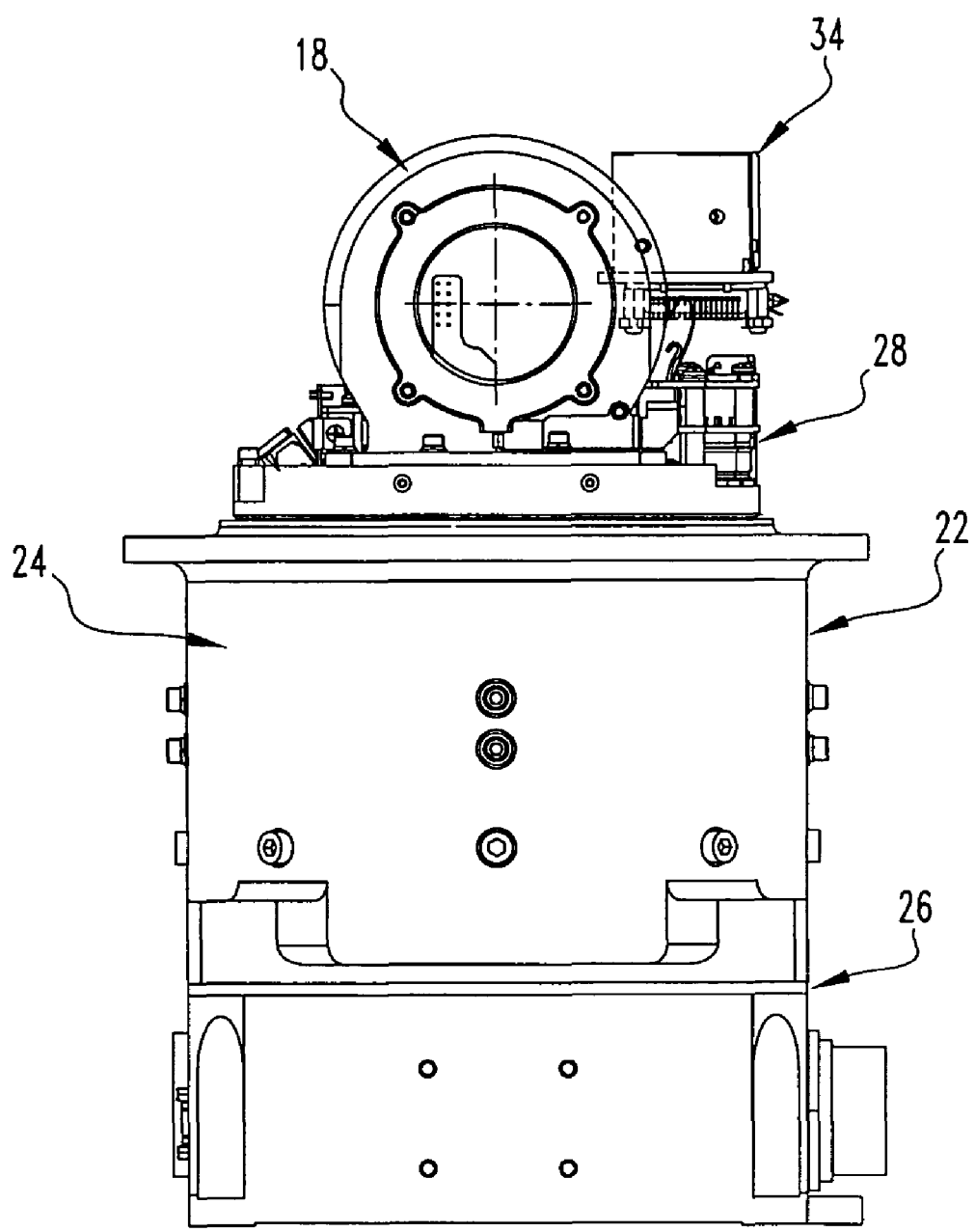

A suitable camera would be a BAE Systems MIM500™ which is shown implemented in FIGS. 3, 4 and 5. This camera would preferable have the characteristics shown in Table 1:

TABLE 1

| | |
|---|---|
| Spectral response: | 7.5-14 microns |
| Resolution: | 320 × 240 |
| Pixel Pitch: | 28 µm |
| Frame Rate: | 60 Hz |
| Digital Video: | LVDS serial or 8 or 16-bit parallel (optional) |
| Analog Video: | RS_170 |
| Electronic Zoom: | 2x, 3x, 4x |
| Interface and Control: | RS-422 |
| Voltage: | 4.5-12.5 VDC |
| Environment: | −46° C. to +85° C. (operational) |
| In production as thermal weapon sight for US Army (15,000) units | |

The assessed requirements fpr resolution would be that two camera boresight must be on axis and coarsely boresighted to within ±1° or ±17.45mRad. The suggested camera would be 320×240 at 10° equates to 727/Rad/pixel with no extrapolation 48× better than assessed resolution. At full zoom resolution would be 2.2mRad, approximately 17× better than assessed requirement with no extrapolation. Frame rate must be adequate to capture image while aircraft pitches, rolls or yaws and be within FoV. The frame rate 60 Hz, at 100°/sec roll equates to 1.66°/frame well within the second camera's FoV of but marginal for a one camera system.

Referring to FIGS. 3-5, the camera is mounted on the gimbal in which it is attached to elevation arm, and rotates with both azimuth and elevation movement. A long-wave camera does not obstruct or use fine track sensor's optical path. Still referring to FIGS. 3-5, the pointer/tracker includes laser and image turning mirrors 10, laser beam and mirror 12, and track image and mirror 14. There is also a gimbal base 16, an elevation drive mechanism 18, and an elevation axis 20. There is a gimbal 22 with an embedded azimuth drive mechanism 24 as well as a base assembly 26 and a dual CCA which includes camera control, resolver excitation and rate sensor power. Also includes is the azimuth axis 30, the dome 32, and a second camera 34 mounted to the elevation axis.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for reducing handoff inaccuracies in a directed infrared countermeasures system having a gimbal with a gimbal axis and a first on-axis camera having an optical axis aligned with the gimbal axis comprising the step of adding a second on-axis camera to the directed infrared countermeasures system that includes the first on-axis camera, the second on-axis camera having an optical axis aligned with the gimbal axis, the addition of the second on-axis camera addressing problems including at least one of aircraft flexure and missile warner problems, the missile warner problems including at least one of inherent tolerances, mounting inaccuracies, resolution, processing latencies, environmental changes and directed infrared pointing errors.

2. The method of claim 1, wherein the first camera includes a fine-track sensor and wherein the second camera has a wide field of view relative to the first camera to acquire a target missile missed by the first camera.

3. The method of claim 2, wherein the second camera includes a focal plane array and wherein the addition of the second camera does not require the focal plane array be of increased size relative to that of the first camera to compensate for lower resolution of the second camera.

4. The method of claim 2, wherein said countermeasure system includes a set of mirrors in the optical path of the first camera and wherein the mirror size associated with said first camera does not need to be changed when adding said second camera.

5. The method of claim 2, wherein the field of view of the second camera is selected to absorb handoff errors.

6. The method of claim 1, wherein the first camera includes a long wavelength IR imaging camera selected to provide a two-color fine track sensor.

7. The method of claim 6, wherein the long wavelength camera is a two color camera.

8. The method of claim 1, wherein the optical axis of the first and second cameras constitute an on-axis boresight.

9. The method of claim 8, wherein the cameras are provided with optical zoom.

10. The method of claim 1, wherein the countermeasure system includes a gimbal and an elevation arm mounted thereto, the gimbal rotating in both azimuth and elevation.

11. The method of claim 10, wherein the first camera includes a fine track sensor and wherein the second camera includes a long wavelength camera.

12. The method of claim 11, wherein the long wavelength camera does not obstruct or use the optical path of the fine track camera.

13. The method of claim 12, wherein the field of view of the long wavelength camera is wider than that of the fine track camera.

14. The method of claim 13, wherein the second camera is mounted to the elevation arm such that coarse aiming of the second camera is provided by gimbal movement.

15. The method of claim 14, wherein the elevation arm includes mirrors for pointing the first camera and wherein the pointing mirrors are not used by the second camera.

* * * * *